(12) United States Patent
Koetsch

(10) Patent No.: US 8,011,134 B2
(45) Date of Patent: Sep. 6, 2011

(54) FOAM HYDROPONIC MATERIAL AND PROCESS FOR MAKING THE SAME

(76) Inventor: David Koetsch, Abbotsford (CA)

( * ) Notice: Subject to any disclaimer, the term of this patent is extended or adjusted under 35 U.S.C. 154(b) by 280 days.

(21) Appl. No.: 12/474,199

(22) Filed: May 28, 2009

(65) Prior Publication Data

US 2010/0005719 A1 Jan. 14, 2010

Related U.S. Application Data

(60) Provisional application No. 61/057,167, filed on May 29, 2008.

(51) Int. Cl.
*A01G 31/00* (2006.01)
(52) U.S. Cl. .............................................. 47/64; 47/59 S
(58) Field of Classification Search .................. 47/59 S, 47/59 R, 64, 61, 62 R, 62 A, 63, 58.1 R, 77, 47/73, 56, 41.01, 41.12; 521/181–187, 49, 521/918; 523/123; 528/502 R, 503
See application file for complete search history.

(56) References Cited

U.S. PATENT DOCUMENTS

| | | | | |
|---|---|---|---|---|
| 2,965,584 A * | 12/1960 | Elkin | | 521/128 |
| 2,988,441 A * | 6/1961 | Pruitt | | 71/27 |
| 3,156,659 A * | 11/1964 | Robitschek | | 521/171 |
| 3,608,238 A * | 9/1971 | Reuter | | 47/64 |
| 4,007,556 A * | 2/1977 | Gluck et al. | | 47/56 |
| 4,034,506 A | 7/1977 | Kasahara et al. | | |
| 4,193,909 A | 3/1980 | Lundberg et al. | | |
| 4,241,537 A * | 12/1980 | Wood | | 47/77 |
| 4,355,484 A * | 10/1982 | Mandish | | 47/63 |
| 4,547,412 A | 10/1985 | Schneider et al. | | |
| 5,207,733 A * | 5/1993 | Perrin | | 47/87 |
| 5,791,085 A * | 8/1998 | Szmidt et al. | | 47/58.1 R |
| 6,174,929 B1 | 1/2001 | Hahnle et al. | | |
| 6,678,996 B1 * | 1/2004 | Visser | | 47/59 S |
| 6,686,414 B1 | 2/2004 | Anderson et al. | | |
| 2005/0076564 A1 | 4/2005 | Castleberry | | |
| 2008/0034653 A1* | 2/2008 | Ramsey et al. | | 47/64 |
| 2009/0019765 A1* | 1/2009 | Kosinski et al. | | 47/64 |
| 2009/0056221 A1* | 3/2009 | Ramsey et al. | | 47/59 R |

* cited by examiner

*Primary Examiner* — Trinh T. Nguyen
(74) *Attorney, Agent, or Firm* — Dwayne E. Rogge; Hughes Law Firm, PLLC

(57) ABSTRACT

A method of creating a hydroponic growing medium. The method includes retrieving polyurethane constituents and mixing the polyurethane constituents in a shear spray mix, creating a resultant foam. Thereafter the resultant foam is placed in a form to cure and a forced heated air is convected in a post-processing step, whereby the hot air convected upon the resultant foam causes additional cracks throughout cell walls within the resultant foam. These fissure cracks allow for a wicking action to occur in the foam, making the material suitable for a hydroponic growing medium.

8 Claims, 3 Drawing Sheets

FOAM HYDROPONIC MATERIAL AND PROCESS FOR MAKING THE SAME

RELATED APPLICATIONS

This application claims priority benefit of U.S. Ser. No. 61/057,167, filed May 29, 2008.

BACKGROUND OF THE DISCLOSURE

Hydroponics are utilized in greenhouse environments for the growing of plants such as tomatoes, peppers, cucumbers, etc. In one form a plug is planted within a starting block, which is (for example) a 3×3 or 4×4 block. Then the starter cube is placed on top of a slab. The block is generally on a concrete floor, the floor is flooded, and the blocks then soak up the water. The floor is flooded and drained in a regimented manner in a propagation stage. Thereafter, the plugs are transported, such as by being loading on a truck and sent to growers, who will take the plant and will cut a hole on the top of the slab and establish a drip line.

In general, the prior art consists of having small starter block cube-like members which are made from what is referred to as "rock wool," which allows for a wicking action of water and nutrients to be absorbed upwardly into the entire unit. As mentioned above, starter cubes are typically between 3 to 4 inches on each side of the square-like pattern for growing such plants, which is generally done by what is called a propagator. This prior art device described above is distributed by Grodan and is made from a silicon base material which is heated and woven and which has the desirable effect of wicking water; however, rock wool can be less than ideal because it is quite heavy, very expensive to manufacturer (although the raw materials are cheap), and very difficult to dispose of.

Polyurethane foam has been utilized as a growing medium in the past; however, using partially open-cell and open-cell polyurethane foam has resulted in poor consistency of the wicking effect of absorbing water therein throughout the polyurethane material. Described herein are a product and a process for making such a product which provides for a polyurethane-based foam that is conducive to hydroponic environments so as to provide sufficient wicking throughout the foam material to result in a desirable growing medium.

SUMMARY OF THE DISCLOSURE

Disclosed herein is a method of creating a hydroponic growing medium. The method includes retrieving polyurethane constituents and mixing the polyurethane constituents in a high sheer spray mix, creating a resultant foam. Thereafter, the resultant foam is placed in a form to cure, at which point a forced heated air is convected in a postprocessing step, whereby the hot air convected upon the resultant foam causes additional cracks throughout cell walls within the resultant foam.

The resultant foam can further undergo a physical postprocessing where the resultant foam is impinged upon by an extension member to further create cracks throughout the cell walls within the resultant foam.

The resultant foam is utilized in a hydroponic setting with plants positioned therein, and water is configured to wick through the cracks throughout cell walls within the resultant foam in one form. When plants are removed from the resultant foam, the resultant foam can be ground-up and utilized as a medium for absorbing hydrocarbon-based liquids. In one form, the hydrocarbon-based liquids are oil spills.

DESCRIPTION OF THE PREFERRED EMBODIMENTS

Described herein is a description of a product and a manufacturing method for producing growing medium in hydroponic environments. By way of general background, starter blocks having a plug placed therein are positioned on a slab for growing various types of plant life. The starter plugs and slab are both comprised of polyurethane, a growing medium used in post-processing procedures. Described immediately below is a method for manufacturing the growing medium, which forms the starter blocks and the slabs in a hydroponic growing operation generally shown at 20 in FIG. 1.

Figure 1:
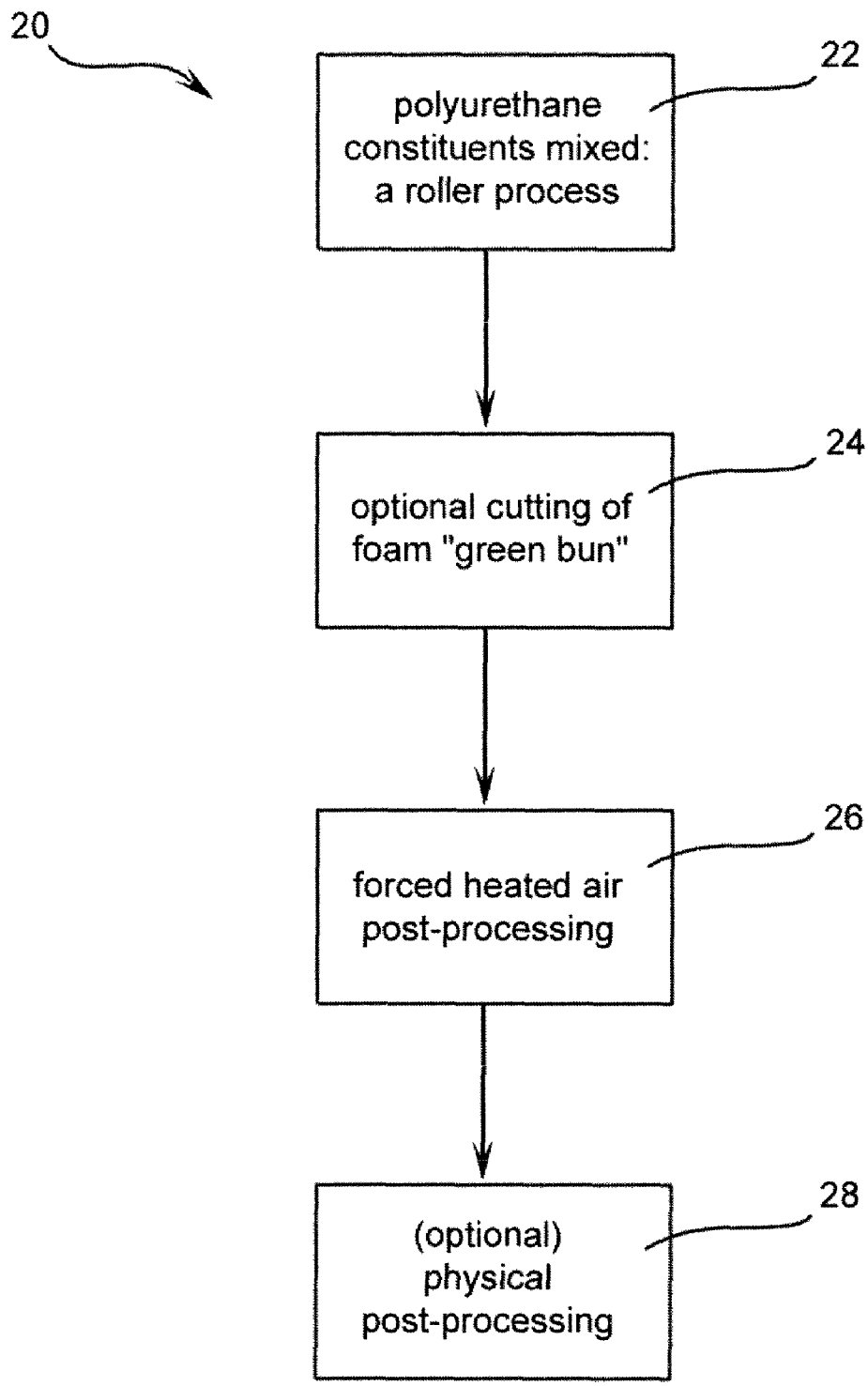
FIG. 1 shows a schematic flowchart of one process for making the plant growing medium.

As shown in step 22 of FIG. 1, polyurethane constituents are generally provided in 45-gallon drums and are maintained in a temperature conditioning room. One form of a polyurethane is a foam from BASF Canada called Elastapour R7315, which is a resin material and is a ½ lbs. foam. In particular, this does not have harsh catalysts (such as heavy metal catalysts as well as others) and silicones as well as harmful catalysts, which are generally found in most resins. Such additional ingredients are generally detrimental to plant life as well as humans.

Control pumps in correct ratios will transfer the material to a high shear mix head which is speed controlled to control how much the mix is sheared. The polyurethane constituents are mixed together and form a higher shear spray mix head at a prescribed temperature and mix rpm. One set of desirable parameter values are approximately between 85° F. at a mix rpm of $1750/3$ plus or minus 20% with a diameter of an inch and a half on a shear mix, which is common in the industry for mixing foam. Another form is to use heavy air nucleation, or alternatively an impingement mix. In general, the polyurethane constituents can be made from either a pour operation using a mix head, or a spray operation using a gun. Of course other forms and equivalents, whether presently known or to be determined, can be utilized as equivalent methods.

The material would be placed on cellophane or shrink film, and thereafter the shrink film becomes the belt, which prevents the chemical from leaking out onto the rollers. This operation can be a continuous process where the liquid foam is entered at one end and exits out at the other end of the press as an expanded foam. Depending on the speed of the system, in one form there can be (for example) 8 feet per minute, or there could be a 20-foot press with approximately three minutes of dwell time for the foam within the press. As mentioned above, a four-sided power driven roller press can be utilized, such as a construction-grade roller press, or alternatively, a slip conveyor with a conveyor belt moving upon any type of upper support platform rollers or surface. In a preferred form, a free-rise bun without overpack is a useful manufacturing method to form a continuous free-rise bun.

The resultant foam generally will not hold water and is called a modified flexible foam, which is partially close cell and partially open cell. In other words, it is not 100% close cell foam. The foam liquid material is placed on a conveyor belt in one form, with four roller conveyors in a box with each roller being powered.

The foam material exiting the press is referred to as a "green bun" where the shrink film is removed and can be disposed of. In another form, Teflon belts could be utilized in place of a shrink film. The temperature is maintained in a temperature-controlled environment during the production of the green bun, and the temperature could be at, for example, 120°-170° F. (130° F. in one preferred form). The block could be 8 inches tall and 10.5 inches wide, and is a continuous bun in one form.

As shown in step 24 in FIG. 1, in a preferred manufacturing process, the bun is trimmed coming out of the roller press to the width to create slabs the requisite design thickness (e.g. 2-4 inches), and thereafter the material is sent to a post-processing procedure.

As noted above, polyurethane foam is problematic for a starter block because it wicks water very poorly. In other words, the foam structures traditionally will not wick or suck up water in an effective, predictable, consistent fashion.

As shown in step 26 of FIG. 1, the green bun will thereafter enter into a high velocity forced air heated environment to induce fissure cracks throughout the bun. In general, the growing medium (foam blocks and starter blocks) is heated to approximately above 200° F., and present analysis indicates that a desirable temperature may include temperatures over (or possibly below) 250° F.; the temperature will be approximately around this value. Further, forced convection is induced, which provides forced convection within some form of a baking oven to heat the foam. It should be noted that the foam is made with a water-blown system, which is common in the industry but the polyols blend is not common in the industry.

In general, the temperature of the force convection air can range depending on the length of the post-curing oven and the dwell time, which of course includes the speed of the bun passing therethrough. In general, by heating the core temperature to approximately 250° F., it will allow for evaporation of water and shrinking the cell walls contained therein to form a mud-cracking-like effect throughout the material. The witnessed phenomenon is that the drawing action creates desirable cracking throughout the material, which has the benefit of wicking the water as further described herein.

The rapid drying degrades the cell wall, thereby exceeding the stress resistance of the material. It should be noted that the melting temperature of the material could be as low as, for example, 220° F. Therefore, applying the forced air at high heat has to be done within a certain timeframe. For example, for a 3-inch by 8-inch cross-sectional continuous bun, present analysis and experimentation indicates that 2 to 2.5 minutes is an appropriate amount of time to subject material to the forced convection heat hot air. Present analysis further indicates that getting the core temperature to approximately 200° F. provides adequate results with the proper amount of fissure cracks.

For example, there may be a sheet of metal with a plurality of holes a half-inch away from the foam with high-pressure hot air. The high velocity may be helpful for a quicker cure and perhaps for penetration of the cube. Present analysis indicates that for best results, the air can be over 120° C., and further indicates that increasing the air velocity can allow for lowering the temperature, and possibly lowering the dwell time as well.

A first type of oven style attempted was a Ferris wheel-like design, where an internal chamber has a high velocity with hot air up over and down the product as it passes therethrough. Another type of oven could be a long elongated tunnel with hot air running along the longitudinal direction of the foam, where the slab on its edge is 3 inches wide and 8 inches tall positioned in an elongated pipe of sorts that have two tabs side-by-side and separated by approximately 2 inches such that air circulates lengthwise at a high velocity and the force convection passes along longitudinally. A third and most desirable design is a direct type of air impact design where, as described above, a panel with a plurality of openings provides orifices for jetting hot air directly upon the foam bun.

After the foam is heated in the temperature in one form post-processing, a pin punch extends vertically in one form through the growing medium so as to crack the foam as shown in step 28 of FIG. 1. The pin punch creates punctures throughout the foam to induce further breakage and create a water pathway therein for wicking water within the foam in a more expeditious manner. However, present analysis indicates that such a physical post-processing step 28 is not required to obtain adequate results.

As noted in the background, the rock wool can be difficult to dispose of; however, although the raw materials of polyurethane are initially more expensive than the raw material of the rock wool, the polyurethane material is considerably lighter (about ⅙ the weight) of rock wool. Further, upon disposal of the growing medium, it can be ground up and reprocessed as an oil-absorbing aggregate material compound or material. In other words, there may be some biological material mixed with the polyurethane, but the ground polyurethane is believed to be a great absorbent of oil and other hydrocarbons. The organic material mixed therein does not present an issue when it operates in this manner.

It should be further noted that the plant growers and the greenhouses will generally allow the plants to suck up all the moisture before the growing medium is recycled. It therefore already comes in a relatively dry state before being ground up and utilized as an oil-absorbing material.

Testing of post-processed polyurethane foam has been very successful, and it has been found after this post-processing that the growing medium would then soak and absorb water on a considerably more consistent basis, and provide a more consistent water-filled growing platform for plants.

Figure 2:
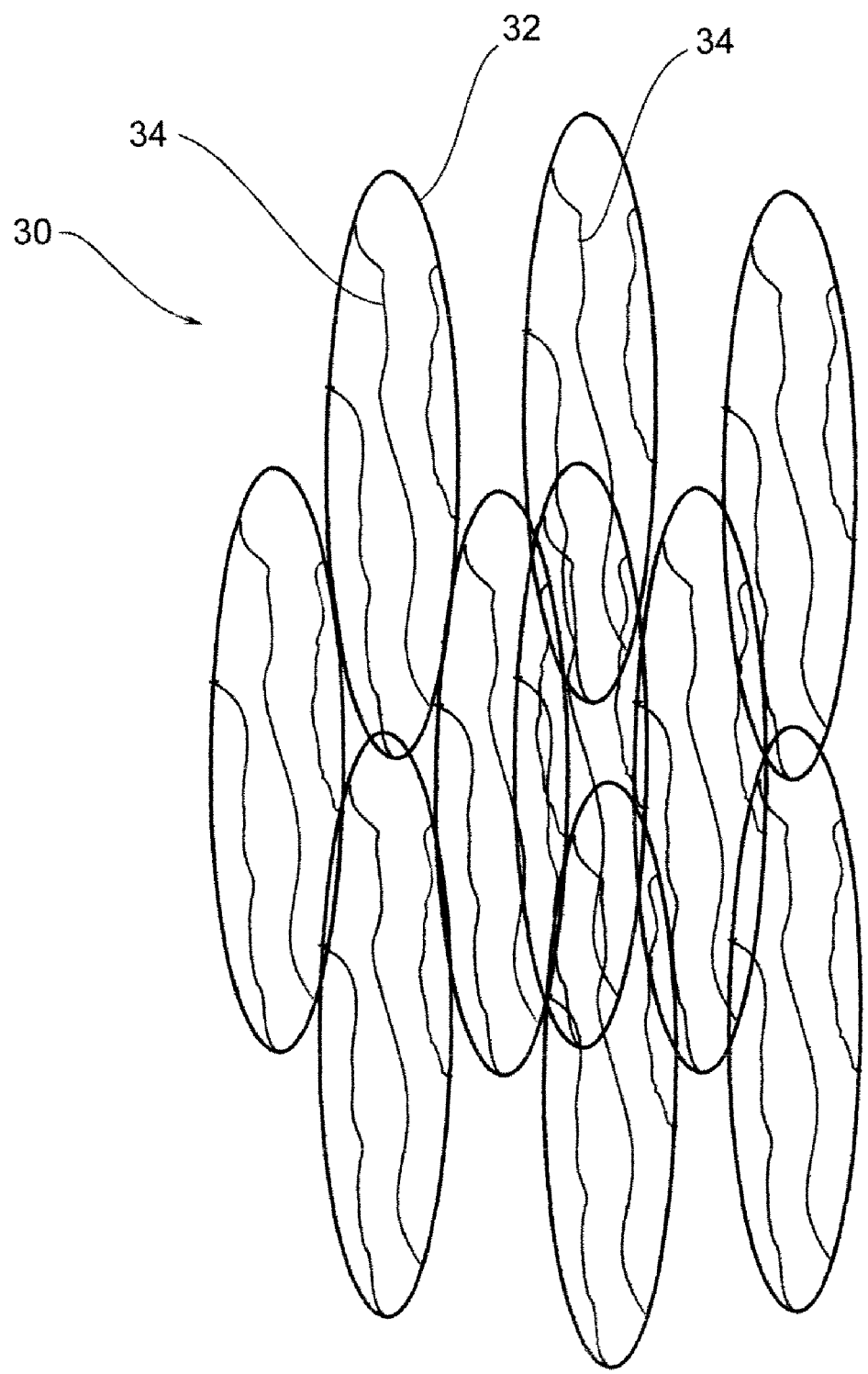
FIG. 2 shows a schematic view of a polyurethane material that has been post-cured so as to induce fissure cracks thereupon.

As shown in FIG. 2, there is a schematic view of the material 30 having a plurality of interior foam cells 32. It can be appreciated that when the polyurethane foam is formed pursuant to the teachings described above in steps 22 of FIG. 1, the cells may be fully closed or partially closed. At any rate, the wicking action of the foam without a post-processing step 26 of FIG. 1 provides for a poor wicking action of water. Therefore, it can be appreciated that the fissure cracks 34 that are schematically shown in FIG. 2 provide additional linear surface area for wicking water throughout the growing medium material/structure. It should be reiterated that FIG. 2 is a schematic artistic rendition of the concepts of the fissure cracks provided in the forced heated air post-processing step 26 of FIG. 1.

Figure 3:
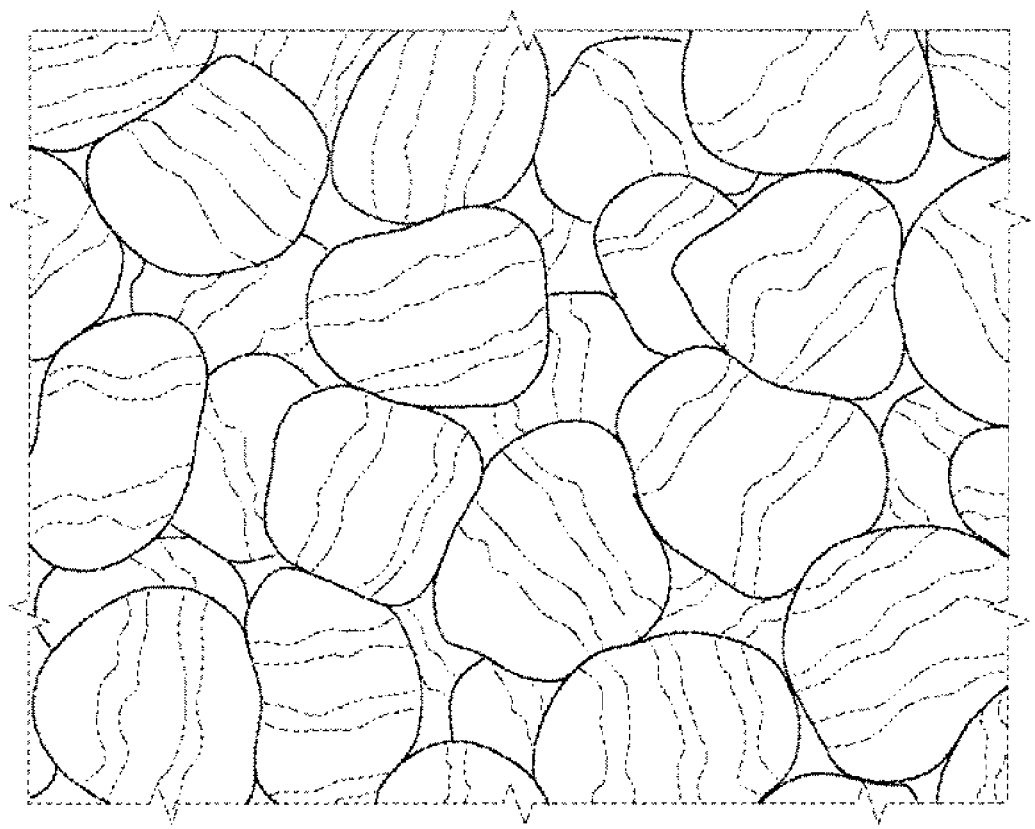
FIG. 3 shows a close-up view of the post-processed polyurethane plant-growing medium.

FIG. 3 shows an actual blown-up view of the polyurethane foam after a post-processing step 26 of FIG. 1. It can be appreciated that the material 30 is provided with a plurality of interior surfaces defining void spaces, whereas the lineal surface area is increased throughout the structure by the post-processing.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. A method of creating a hydroponic growing medium comprising:
   a. collecting polyurethane constituents and mixing the polyurethane constituents in a pour or spray process creating a mixed chemical composition,
   b. placing the mixed chemical composition in a form to cross link and react to create a resultant foam,
   c. curing the resultant foam and applying heat of at least 110° F. upon the resultant foam to have the resultant foam substantially maintain its shape,
   d. conducting post processing by convecting forced heated air of at least 200° F. whereby hot air is convected upon the resultant foam causing additional cracks throughout cell walls within the resultant foam,
   e. whereas the cracks throughout cell walls within the resultant foam are capable of wicking water therein, making the resultant foam conducive for a hydroponic growing medium.

2. The method as recited in claim 1 where the resultant foam undergoes a physical post-processing and is impinged upon by an extension member to further create cracks throughout the cell walls within the resultant foam.

3. The method as recited in claim 2 where the resultant foam is utilized in a hydroponic setting with plants positioned therein and water is configured to wick through the cracks throughout cell walls within the resultant foam.

4. The method as recited in claim 3 where after the plants are removed from the resultant foam, the resultant foam is ground-up and utilized as a medium for absorbing hydrocarbon-based liquids.

5. The method as recited in claim 4 where the hydrocarbon-based liquids are oil spills.

6. The method as recited in claim 1 where the forced hot air in the post-processing is at a temperature above the melting point of the resulted foam.

7. The method as recited in claim 6 where the forced hot air is applied to the resultant foam for at least two minutes.

8. The method as recited in claim 1 where the polyurethane constituents do not include silicones or harmful catalysts.

* * * * *